(12) United States Patent
Lee

(10) Patent No.: US 10,648,544 B2
(45) Date of Patent: May 12, 2020

(54) VARIABLE BELT TENSIONER FOR ENGINE AND METHOD FOR CONTROLLING MILD HYBRID VEHICLE USING VARIABLE BELT TENSIONER FOR ENGINE

(71) Applicants: HYUNDAI MOTOR COMPANY, Seoul (KR); KIA MOTORS CORPORATION, Seoul (KR)

(72) Inventor: Jong Won Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 347 days.

(21) Appl. No.: 15/797,389

(22) Filed: Oct. 30, 2017

(65) Prior Publication Data

US 2018/0355955 A1 Dec. 13, 2018

(30) Foreign Application Priority Data

Jun. 9, 2017 (KR) .......................... 10-2017-0072430

(51) Int. Cl.
*F16H 7/12* (2006.01)
*F16H 7/08* (2006.01)
(Continued)

(52) U.S. Cl.
CPC ........... *F16H 7/1209* (2013.01); *B60W 20/00* (2013.01); *F02B 67/06* (2013.01); *F16H 7/0829* (2013.01);
(Continued)

(58) Field of Classification Search
CPC .... F16H 7/1209; F16H 7/0829; F16H 7/1245; F16H 7/0838; F16H 7/0831;
(Continued)

(56) References Cited

U.S. PATENT DOCUMENTS 10,029,695 B1\* 7/2018 Gibson ................. B60W 20/50
2006/0276284 A1\* 12/2006 Lancaster ............... F02B 67/06
474/110

(Continued)

FOREIGN PATENT DOCUMENTS

| JP | 2015-025538 A | 2/2015 |
| KR | 20-0174841 Y1 | 4/2000 |
| KR | 10-1369590 B1 | 3/2014 |

*Primary Examiner* — Michael R Mansen
*Assistant Examiner* — Mark K Buse
(74) *Attorney, Agent, or Firm* — Morgan, Lewis & Bockius LLP

(57) ABSTRACT

A variable belt tensioner for an engine includes: a first damper; and a second damper connected to the first damper through a driver. The first damper, the second damper, and the driver causes a belt connected to a crankshaft pulley and a starter-generator pulley to have a first tensile strength when the engine including the crankshaft pulley starts, the first damper, the second damper, and the driver causes the belt to have a second tensile strength that is less than the first tensile strength when an electric power is generated by the starter-generator pulley, and the first damper, the second damper, and the driver causes the belt to have a third tensile strength that is less than the second tensile strength when the vehicle is accelerated by the engine.

8 Claims, 7 Drawing Sheets

(51) Int. Cl.
  *B60W 20/00* (2016.01)
  *F02B 67/06* (2006.01)
  *F02N 11/04* (2006.01)

(52) U.S. Cl.
  CPC ........... *B60Y 2200/92* (2013.01); *F02N 11/04* (2013.01); *F16H 2007/0806* (2013.01); *F16H 2007/0823* (2013.01); *F16H 2007/0865* (2013.01); *F16H 2007/0874* (2013.01); *F16H 2007/0885* (2013.01); *F16H 2007/0893* (2013.01); *F16H 2007/0897* (2013.01); *Y10S 903/903* (2013.01)

(58) Field of Classification Search
  CPC .......... F16H 7/1281; F16H 2007/0885; B60W 20/00; F02B 67/06
  See application file for complete search history.

(56) References Cited

U.S. PATENT DOCUMENTS

| | | | |
|---|---|---|---|
| 2010/0257951 A1* | 10/2010 | Quincerot | F02N 11/0814 74/6 |
| 2012/0065009 A1* | 3/2012 | Mueller | F02B 67/06 474/101 |
| 2012/0259510 A1* | 10/2012 | Detrois | F02B 67/06 701/36 |
| 2014/0130635 A1* | 5/2014 | Kees | F02N 11/006 74/7 R |
| 2014/0309882 A1* | 10/2014 | Antchak | F02B 67/06 701/36 |
| 2015/0126315 A1* | 5/2015 | Farewell | F02B 67/06 474/109 |
| 2015/0167796 A1* | 6/2015 | Noguchi | F16H 7/1281 477/3 |
| 2015/0247559 A1* | 9/2015 | Graves | F02B 67/06 474/117 |
| 2015/0308545 A1* | 10/2015 | Harvey | F16H 7/1218 474/117 |
| 2016/0318519 A1* | 11/2016 | Hirai | F02N 19/005 |
| 2017/0204945 A1* | 7/2017 | Emig | F02B 67/06 |
| 2018/0017143 A1* | 1/2018 | Antchak | B60K 25/02 |
| 2019/0186601 A1* | 6/2019 | Lee | F02N 19/00 |
| 2019/0285148 A1* | 9/2019 | Ma | B60K 25/02 |
| 2019/0285149 A1* | 9/2019 | Ogawa | F16H 7/1281 |

* cited by examiner

VARIABLE BELT TENSIONER FOR ENGINE AND METHOD FOR CONTROLLING MILD HYBRID VEHICLE USING VARIABLE BELT TENSIONER FOR ENGINE

CROSS-REFERENCE TO RELATED APPLICATION

This application claims the benefit of priority to Korean Patent Application No. No. 10-2017-0072430 filed in the Korean Intellectual Property Office on Jun. 9, 2017, the entire content of which is incorporated herein by reference.

TECHNICAL FIELD

The present disclosure relates to a vehicle, and more particularly, to a variable belt tensioner for an engine and a method for controlling a mild hybrid vehicle using the variable belt tensioner for the engine.

BACKGROUND

A hybrid electric vehicle uses both an internal combustion engine and a battery power source. The hybrid electric vehicle efficiently combines the torque of the internal combustion engine and the torque of a motor.

Hybrid electric vehicles may be categorized as either a hard type or a mild type according to a power sharing ratio between the engine and the motor. In the case of the mild type of hybrid electric vehicle (or a mild hybrid electric vehicle), a mild hybrid starter & generator (MHSG) configured to start the engine or generate electricity according to an output of the engine is used instead of an alternator. In the case of the hard type of hybrid electric vehicle, a driving motor for generating driving torque is used in addition to an integrated starter & generator (ISG) configured to start the engine or generate electricity.

The mild hybrid electric vehicle does not provide a driving mode in which torque of the MHSG is used for the main driving torque, but the MHSG may assist the torque of the engine according to the running state of the vehicle and may charge a battery (e.g., a 48 V battery) through regenerative braking. Accordingly, the fuel efficiency of the mild hybrid electric vehicle may be improved.

A vehicle may include an auxiliary system that operates by receiving rotational power of an engine. The auxiliary system includes a generator (or an alternator), a compressor for an air conditioner, a hydraulic device, and a water pump.

The rotational power of the engine is transmitted from a crankshaft to the auxiliary system by a belt. The auxiliary system includes a pulley for receiving rotational power from the belt.

The belt wound on the pulley tends to be integrated into one, so that the length of the belt has been increased in order to drive the auxiliary system by one belt. Therefore, it has become important to keep the tension of the belt appropriately for smooth transfer of the rotational power.

In order to properly maintain the tension of the belt, a belt tensioner is used. There are various types of belt tensioners such as a mechanical type and a hydraulic type.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a variable belt tensioner for an engine and a method for controlling a mild hybrid vehicle using the variable belt tensioner for the engine which is capable of adjusting in three stages a tension of a belt connected to a crankshaft pulley of an engine.

According to an exemplary embodiment of the present disclosure, a variable belt tensioner for an engine includes: a first damper; and a second damper connected to the first damper through a driver. The first damper, the second damper, and the driver may cause a belt connected to a crankshaft pulley and a starter-generator pulley to have a first tensile strength when the engine including the crankshaft pulley starts, the first damper, the second damper, and the driver may cause the belt to have a second tensile strength that is less than the first tensile strength when an electric power is generated by the starter-generator pulley, and the first damper, the second damper, and the driver may cause the belt to have a third tensile strength that is less than the second tensile strength when the vehicle is accelerated by the engine.

The driver may include a solenoid device including a spring.

The solenoid device may further include a solenoid compressing the spring.

The variable belt tensioner may further include: a first pulley that is driven by the first damper and the driver to set a tension of the belt as the first tensile strength, the second tensile strength, or the third tensile strength; and a second pulley that is driven by the second damper and the driver to set a tension of the belt as the first tensile strength, the second tensile strength, or the third tensile strength.

The belt connected to the crankshaft pulley and the starter-generator pulley may be connected to a compressor pulley.

According to another exemplary embodiment of the present disclosure, a method for controlling a mild hybrid vehicle using a variable belt tensioner for the engine includes: controlling, by a controller, a driver connected to a first damper and a second damper that are included in the variable belt tensioner at a start of the engine including a crankshaft pulley to set a tension of a belt connected to the crankshaft pulley and a starter-generator pulley to a first tensile strength; controlling, by the controller, the driver to set the tension of the belt to a second tensile strength that is less than the first tensile strength when an electric power is generated by the starter-generator pulley; and controlling, by the controller, the driver to set the tension of the belt to a third tensile strength that is less than the second tensile strength when the mild hybrid vehicle is accelerated by the engine.

The controlling the driver to set the tension of the belt to the first tensile strength may include: compressing, by the controller, a spring of the driver to set the tension of the belt to the first tensile strength.

The method for controlling the mild hybrid vehicle may further include: controlling, by the controller, the driver to set the tension of the belt to the second tensile strength when an angular velocity fluctuation of a crankshaft of the engine has a maximum value.

The method for controlling the mild hybrid vehicle may further include: controlling, by the controller, the driver to set the tension of the belt to the third tensile strength when an angular velocity fluctuation of a crankshaft of the engine is reduced.

The variable belt tensioner for the engine and the method for controlling the mild hybrid vehicle according to the exemplary embodiment of the present disclosure may divide an operating region of the mild hybrid vehicle into three regions and may differently set a necessary tension according to the divided operating region (or a load applied to the engine of the mild hybrid vehicle). Therefore, the exemplary embodiment of the present disclosure may reduce a loss or an output loss of the engine to improve fuel efficiency of the vehicle.

Further, the exemplary embodiment of the present disclosure may optimize the tension of the belt according to the operating region using three stages of the tension of the belt connected to the engine of the mild hybrid vehicle.

BRIEF DESCRIPTION OF THE DRAWINGS

A brief description of the drawings will be provided to more sufficiently understand the drawings which are used in the detailed description of the present disclosure.

DETAILED DESCRIPTION OF THE EMBODIMENTS

Figure 1:
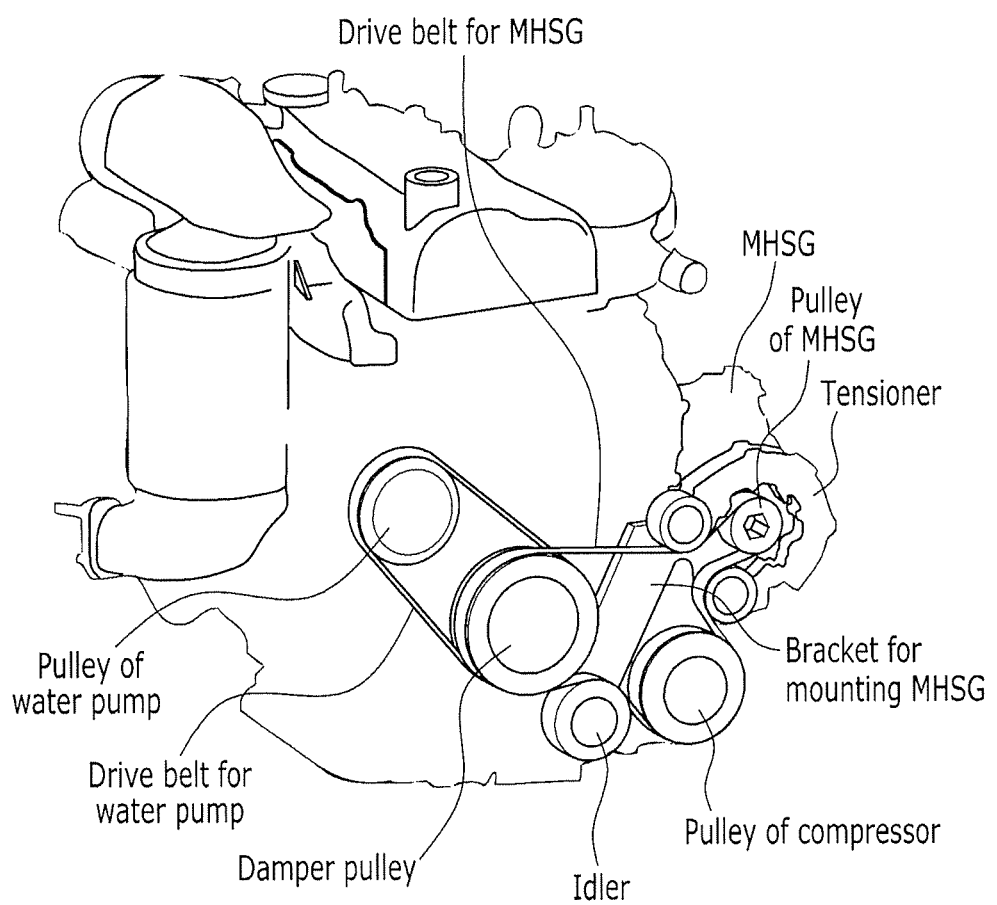
FIG. 1 is a view for explaining an example of an engine of a mild hybrid vehicle.

In order to sufficiently understand the present disclosure and the object achieved by embodying the present disclosure, the accompanying drawings illustrating exemplary embodiments of the present disclosure and contents described in the accompanying drawings are to be referenced.

Hereinafter, the present disclosure will be described in detail by describing exemplary embodiments of the present disclosure with reference to the accompanying drawings. In describing the present disclosure, well-known configurations or functions will not be described in detail since they may unnecessarily obscure the gist of the present disclosure. Throughout the accompanying drawings, the same reference numerals will be used to denote the same components.

Terms used in the present specification are only used in order to describe specific exemplary embodiments rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

FIG. 1 is a view for explaining an example of an engine of a mild hybrid vehicle.

Referring to FIG. 1, a fixed tensioner (e.g., a fixed belt tensioner) may be installed on the engine by a bracket for mounting a mild hybrid starter and generator (MHSG). Thus, a belt connected to a damper pulley (e.g., a crankshaft pulley connected to a crankshaft of the engine) of the engine cannot have another tension. In more detail, during start-up and normal operations of the engine, the fixed tensioner causes the belt to have a same tension.

Therefore, when the engine starts by driving of the MHSG (e.g., a belt-driven integrated starter generator (BSG)), the tensioner is designed so that the belt has a large tension of 500 N in order to cope with the greatest load fluctuation of the engine.

The tension of 500 N may be a tension required only at the start of the engine and a tension of about 250 N may satisfy driving characteristics of an auxiliary-machinery belt (e.g., a water pump drive belt, the MHSG drive belt) during the engine operating interval excluding the start-up interval of the engine. In order to satisfy these tensions, the tensioner shown in FIG. 1 may be a tensioner that varies the tension of the belt in two stages.

The damper pulley may be connected to a water pump pulley, a MHSG pulley, a compressor pulley, and an idler by the belt.

Figure 2:
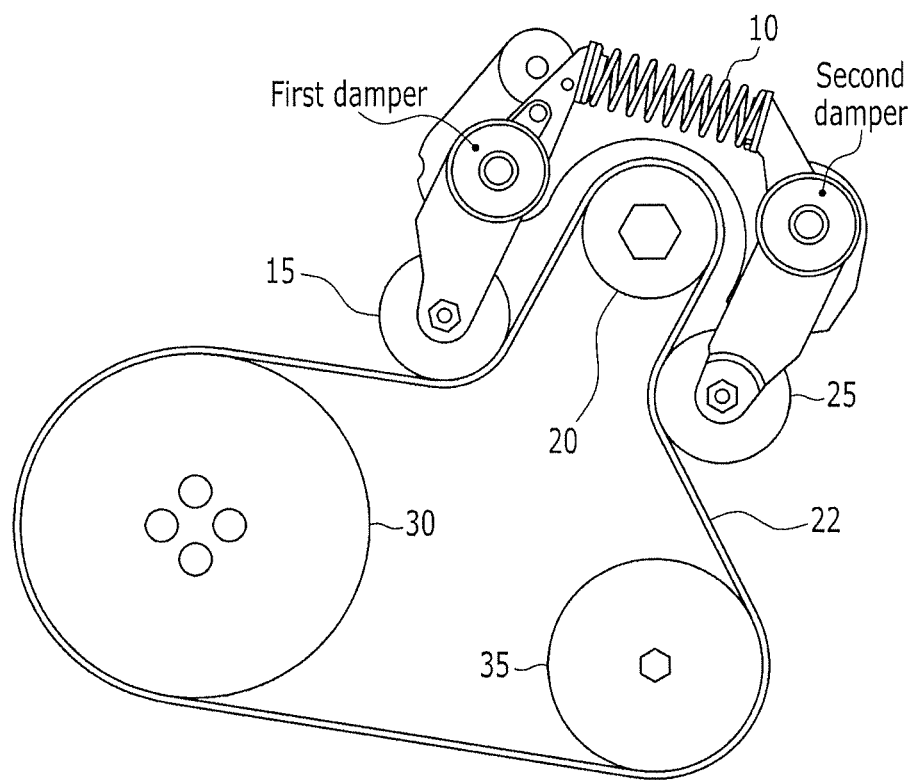
FIG. 2 is a view for explaining an example of a tensioner shown in FIG. 1.

FIG. 2 is a view for explaining an example of the tensioner shown in FIG. 1.

Referring to FIG. 2, the tensioner is a fixed belt tensioner that uses a fixed spring force of a coil spring 10 and damping forces of two dampers to cause the belt 22 connected to the damper pulley 30, the MHSG pulley 20, and the compressor pulley 35 to have a tension. A first damper is connected to a tensioner pulley 15 through an arm and to the coil spring 10 through the arm. A second damper is connected to a tensioner pulley 25 through an arm and to the coil spring 10 through the arm.

When the engine connected to the damper pulley 30 starts and an electric power is generated by the MHSG pulley 20, the tensioner causes a tension of the belt 22 to become a same tensile strength using the first damper, the second damper, and the coil spring 10.

Figure 3:
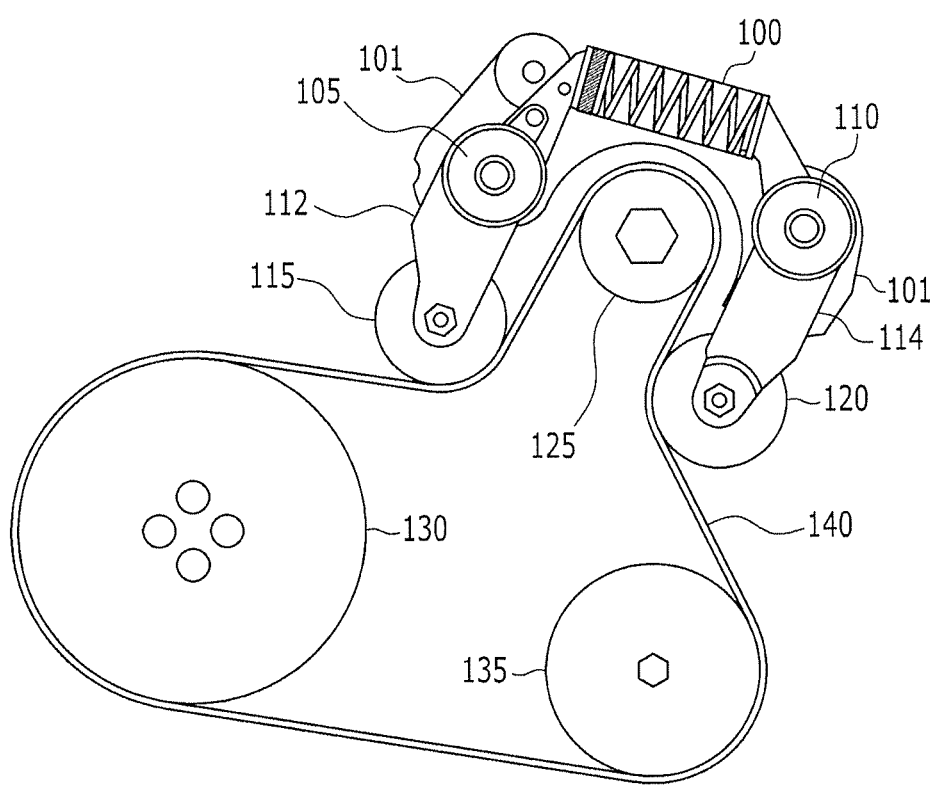
FIG. 3 is a view explaining a variable belt tensioner for an engine according to an exemplary embodiment of the present disclosure.
Figure 4:
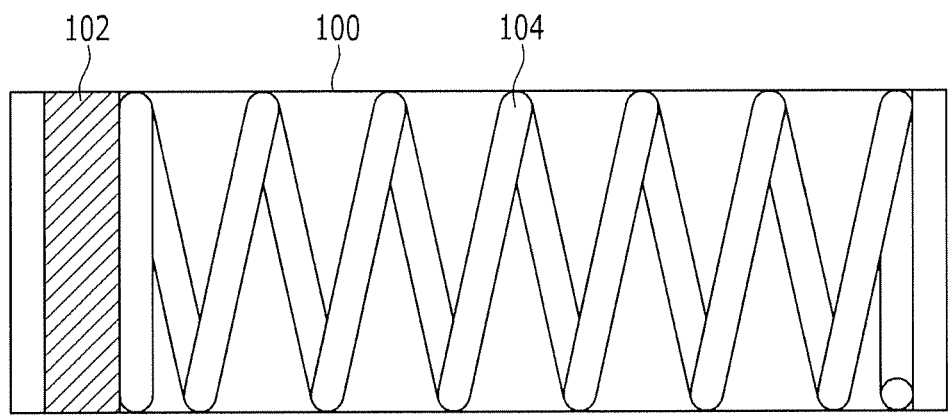
FIGS. 4-6 are views explaining operating states of a driver shown in FIG. 3.
Figure 5:
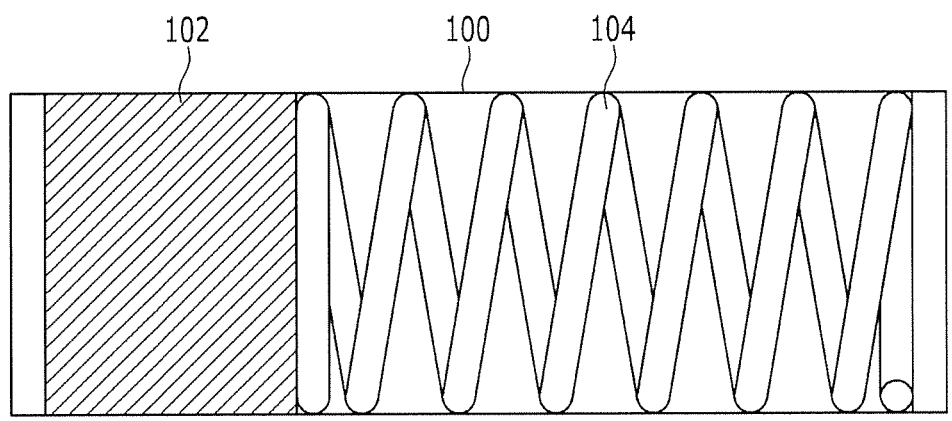
Figure 6:
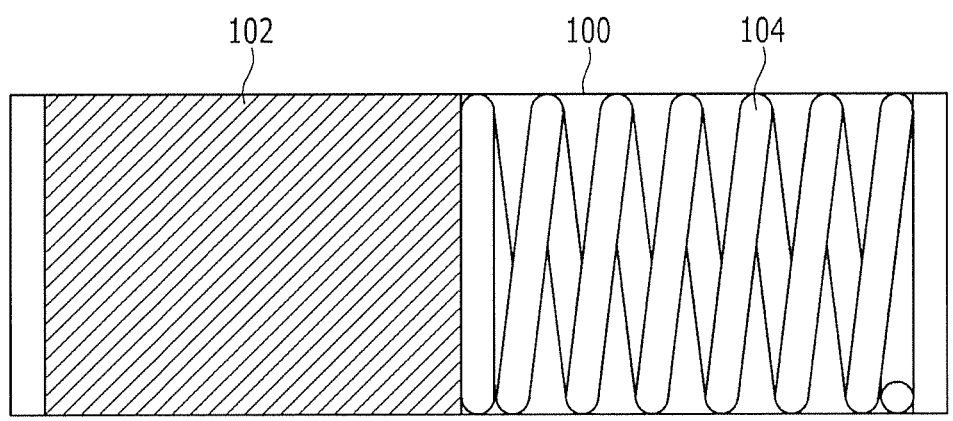
Figure 7:
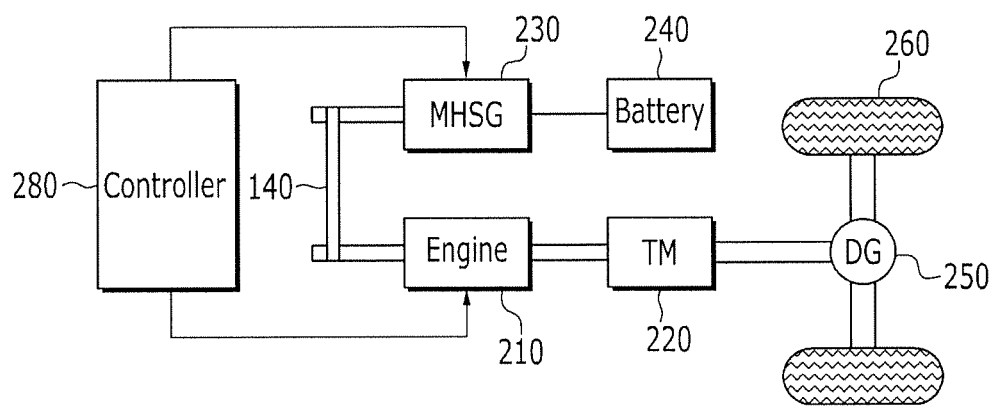
FIG. 7 is a block diagram illustrating a mild hybrid vehicle to which a method for controlling the mild hybrid vehicle using the variable belt tensioner for the engine according to the exemplary embodiment of the present disclosure is applied.

FIG. 3 is a view explaining a variable belt tensioner for an engine according to an exemplary embodiment of the present disclosure. FIG. 4 to FIG. 6 are views explaining operating states of a driver shown in FIG. 3. FIG. 7 is a block diagram illustrating a mild hybrid vehicle to which a method for controlling the mild hybrid vehicle using the variable belt tensioner for the engine according to the exemplary embodiment of the present disclosure is applied.

Referring to FIG. 3 to FIG. 7, the variable belt tensioner includes a first damper 105, a second damper 110, a driver 100 such as a solenoid device, a first pulley 115, and a second pulley 120. The variable belt tensioner may be installed in the engine shown in FIG. 1. The first damper 105 and the second damper 110 may be devices suppressing or controlling vibration of a belt 140. Each of the first damper 105 and the second damper 110 may include a spring.

The solenoid device 100 may include a solenoid (e.g., a solenoid actuator) 102 and a spring 104 such as a coil spring.

The tensioner may be controlled or adjusted in three stages. The tensioner may cause the belt 140 connected to a crankshaft pulley (e.g., a damper pulley) 130, a starter-generator pulley (e.g., a MHSG pulley) 125, and a compressor pulley 135 to have a tension using three stages of a spring force of the solenoid device 100 and damping forces (e.g., damping forces by friction) of two dampers 105 and 110. In another exemplary embodiment of the present disclosure, the belt 140 may be connected only to the crankshaft pulley 130 and the starter-generator pulley 125.

The crankshaft pulley 130 may be installed on a crankshaft of an engine 210. The starter-generator pulley 125 may be included in a starter-generator (e.g., a mild hybrid starter and generator (MHSG)) 230. The compressor pulley 135 may be included in a compressor of an air conditioner.

The crankshaft pulley 130, the starter-generator pulley 125, and the compressor pulley 135 may be connected to each other via the belt 140 that transmits power. In more detail, a rotational force of the engine 210 may be transmitted through the belt 140 from the crankshaft pulley 130 to the compressor pulley 135 and the starter-generator pulley 125, and a rotational force of the starter-generator 230 may be transmitted through the belt from the starter-generator pulley to the crankshaft pulley and the compressor pulley.

The first damper 105 may be connected to the first pulley (e.g., a first tensioner pulley) 115 via a first arm 112 and may be connected to the solenoid device 100 through the first arm. The first damper 105 may be installed in a hole of the first arm 112. The second damper 110 may be connected to the second pulley 120 through a second arm 114 and may be connected to the solenoid device 100 through the second arm. The second damper 110 may be installed in a hole of the second arm 114.

A damping force due to friction may be generated between the first damper 105 and the first arm 112, and a damping force due to friction may be generated between the second damper 110 and the second arm 114.

The first pulley 115 may be supported by the first arm 112. The second pulley 120 may be supported by the second arm 114. The first pulley 115 and the second pulley 120 may support the belt 140 and may be rotated by the belt. The first pulley 115 may be driven or moved by the first damper 105 and the driver 100 to set a tension of the belt 140 as a first tensile strength that is a high tensile strength, a second tensile strength that is an intermediate tensile strength and is less than the first tensile strength, or a third tensile strength that is a low tensile strength and is less than the second tensile strength. The second pulley 120 may be driven or moved by the second damper 110 and the driver 100 to set the tension of the belt 140 as the first tensile strength, the second tensile strength, or the third tensile strength.

The variable belt tensioner may include a tensioner body 101 in which the first damper 105 and the second damper 110 are installed. The tensioner body 101 may be attached or installed to the starter-generator 230.

When the engine 210 including the crankshaft pulley 130 starts, the tensioner may cause the belt 140 to have the first tensile strength using the first damper 105, the second damper 110, and an operating state of the solenoid device 100 shown in FIG. 6. In more detail, the first damper 105, the second damper 110, and the solenoid device 100 may set or adjust the tension of the belt 140 to the first tensile strength using the first pulley 115 and the second pulley 120. In other words, the spring 104 of the solenoid device 100, the first damper 105, and the second damper 110 may rotate the first arm 112 with respect to the first damper 105 that is a center of rotation and may rotate the second arm 114 with respect to the second damper 110 that is a center of rotation so that the tension of the belt 140 is set to the first tensile strength.

Referring to FIGS. 3 and 6, the solenoid 102 of the solenoid device 100 may be driven or operated to compress the spring 104 by a first length so that the tension of the belt 140 is set to the first tensile strength.

When an electric power is generated by the starter-generator pulley 125 or the mild hybrid vehicle shown in FIG. 7 decelerates, the tensioner may cause the belt 140 to have the second tensile strength using the first damper 105, the second damper 110, and an operating state of the solenoid device 100 shown in FIG. 5. In more detail, the first damper 105, the second damper 110, and the solenoid device 100 may set the tension of the belt 140 to the second tensile strength using the first pulley 115 and the second pulley 120. In other words, the spring 104 of the solenoid device 100, the first damper 105, and the second damper 110 may rotate the first arm 112 with respect to the first damper 105 that is a center of rotation and may rotate the second arm 114 with respect to the second damper 110 that is a center of rotation so that the tension of the belt 140 is set to the second tensile strength.

Referring to FIGS. 3 and 5, the solenoid 102 of the solenoid device 100 may be driven or operated to compress the spring 104 as much as a second length less than the first length so that the tension of the belt 140 is set to the first tensile strength.

When the mild hybrid vehicle shown in FIG. 7 is accelerated by the engine 210, the tensioner may cause the belt 140 to have the third tensile strength using the first damper 105, the second damper 110, and an operating state of the solenoid device 100 shown in FIG. 4. In more detail, the first damper 105, the second damper 110, and the solenoid device 100 may set the tension of the belt 140 to the third tensile strength using the first pulley 115 and the second pulley 120. In other words, the spring 104 of the solenoid device 100, the first damper 105, and the second damper 110 may rotate the first arm 112 with respect to the first damper 105 that is a center of rotation and may rotate the second arm 114 with respect to the second damper 110 that is a center of rotation so that the tension of the belt 140 is set to the third tensile strength.

Referring to FIGS. 3 and 4, the solenoid 102 of the solenoid device 100 may be driven or operated to compress the spring 104 by a third length less than the second length so that the tension of the belt 140 is set to the third tensile strength. In another exemplary embodiment of the present disclosure, the solenoid 102 may not be driven or operated not to compress the spring 104 so that the tension of the belt 140 is set to the third tensile strength.

An operating region of the mild hybrid vehicle (or the engine 210) classified according to driving tension used in a belt system of the mild hybrid vehicle is described as follows.

A first operating region may be a region in which the engine 210 (or the mild hybrid vehicle) starts using the starter-generator 230 connected to the engine 210 via the belt 140 and the tension of the belt connected to the engine and the starter-generator is set to the first tensile strength. Information on the first operating region may be detected by a sensor (e.g., an engine operation detecting sensor) included in the mild hybrid vehicle and may be provided to the controller 280.

An instantaneous slip of the belt at the start of the engine may be increased by up to 25% and an operating angle of the arm of the belt tensioner may be increased by about 2 times. Thus, the high tensile strength may be set in the first operating region.

A second operating region may be a region where the engine 210 cold-starts by the starter-generator 230, the mild hybrid vehicle of FIG. 7 is decelerated to generate an electric power, the engine is in an idle state, or a number of revolution of the engine is less than 1000 revolutions per minute (RPM) and the crankshaft angular velocity fluctuation has a maximum value. The tension of the belt 140 may be set to the second tensile strength in the second operating region. The second operating region may be a region where a load due to auxiliary machinery assisting driving of the engine 210 has a maximum value and a loss due to the auxiliary machinery belt with respect to the engine drive torque is great. Information on the second operating region may be detected by a sensor (e.g., a vehicle speed detecting sensor) included in the mild hybrid vehicle and may be provided to the controller 280.

A third operating region may be a region where the mild hybrid vehicle of FIG. 7 accelerates or a number of revolution of the engine 210 is greater than or equal to 1000 RPM and the crankshaft angular velocity fluctuation is decreased. The tension of the belt 140 may be set to the third tensile strength in the third operating region. The third operating region may be a normal drive region of the engine, may be a non-power generation region of the starter-generator 230, and may be a region where the loss due to the auxiliary machinery belt is small relative to the engine drive torque. Information on the third operating region may be detected by a sensor (e.g., an acceleration sensor) included in the mild hybrid vehicle and may be provided to the controller 280.

The method for controlling the mild hybrid vehicle using the variable belt tensioner for the engine according to the exemplary embodiment of the present disclosure will be described as follows with reference to FIG. 3 to FIG. 7.

According to a first adjustment step, the controller 280 may control the driver 100 connected to the first damper 105 and the second damper 110 at the start of the engine 210 including the crankshaft pulley 130 to set the tension of the belt 140 connected to the crankshaft pulley 130 and the starter-generator pulley 125 to the first tensile strength. In another exemplary embodiment of the present disclosure, the controller 280 may compress the spring 104 of the driver 100 to set the tension of the belt 140 to the first tensile strength.

For example, the controller 280 may be one or more microprocessors operated by a program or hardware (e.g., an electronic control unit (ECU)) including the microprocessor. The program may include a series of commands for executing the method for controlling the mild hybrid vehicle using the variable belt tensioner for the engine according to the exemplary embodiment of the present disclosure. The commands may be stored in a memory. The controller 280 may control an overall operation of the mild hybrid vehicle.

The mild hybrid vehicle includes the engine 210, a transmission 220, the starter-generator 230, a battery 240, a differential gear device 250, wheels 260, and the controller 280.

The engine 210 may convert chemical energy to mechanical energy by burning fuel and air. Torque of the engine 210 may be transmitted to an input shaft of the transmission 220, and torque output from an output shaft of the transmission may be transmitted to an axle of the vehicle via the differential gear device 250. The axle may rotate the wheels 260 so that the mild hybrid vehicle may be driven.

The starter-generator 230 may convert electrical energy to mechanical energy or mechanical energy to electrical energy. In other words, the starter-generator 230 may start the engine 210 or generate electricity according to an output of the engine 210. In addition, the starter-generator 230 may assist the torque of the engine 210. The mild hybrid vehicle may use the torque of the starter-generator 230 as an auxiliary power while combustion torque of the engine 210 is a main power. The engine 210 and the starter-generator 230 may be connected via the belt 140 (or a pulley and a belt).

The battery 240 may supply electricity to the starter-generator 230 or may be charged by electricity collected through the starter-generator 230 in a regenerative braking mode of the vehicle. The battery 240 may be a 48 V battery. The mild hybrid vehicle may further include a low voltage DC-DC converter (LDC) that converts voltage supplied from the battery 240 to a low voltage and a 12 V battery that supplies the low voltage to an electric load of the vehicle.

In the mild hybrid vehicle, the starter-generator 230 may be a part performing functions of an alternator, the engine torque assist, or regenerative braking.

The starter-generator 230 may drive the engine 210 of the vehicle in a cranking and torque control mode of the vehicle (or the engine) and may generate electricity according to an output of the engine to charge the 48 V battery 240 in an electricity generation mode of the vehicle. The starter-generator 230 may operate in an operating mode in accordance with a driving state of the vehicle. The operating mode may include an engine starting mode, an engine torque assist mode for assisting torque of the engine by operating as a motor, a mode for charging the 48 V battery charging the 12 V battery that is connected to the 48 V battery via the LDC, a regenerative braking mode for charging the 48 V battery, or an inertial driving mode for extending a mileage of the vehicle. The starter-generator 230 may be optimally controlled according to the driving state of the vehicle to increase fuel efficiency of the vehicle.

According to a second adjustment step, when an electric power is generated by the starter-generator pulley 125, the controller 280 may control the driver 100 connected to the first damper 105 and the second damper 110 to set the tension of the belt 140 to the second tensile strength that is less than the first tensile strength. In another exemplary embodiment of the present disclosure, when an angular velocity fluctuation of the crankshaft of the engine 210 has a maximum value, the controller 280 may control the driver 100 connected to the first damper 105 and the second damper 110 to set the tension of the belt 140 to the second tensile strength.

According to a third adjustment step, when the mild hybrid vehicle is accelerated by the engine 210, the controller 280 may control the driver 100 connected to the first damper 105 and the second damper 110 to set the tension of the belt 140 to the third tensile strength that is less than the second tensile strength. In another exemplary embodiment of the present disclosure, when the angular velocity fluctuation of the crankshaft of the engine 210 is reduced, the controller 280 may control the driver 100 connected to the first damper 105 and the second damper 110 to set the tension of the belt 140 to the third tensile strength.

As described above, the exemplary embodiment of the present disclosure may use the variable belt tensioner to control the mild hybrid vehicle of FIG. 7 based on the operating region of the engine divided into three regions.

The components, "~unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present disclosure and are not used for qualifying the meaning or limiting the scope of the present disclosure, which is disclosed in the appended claims. Therefore, it will be understood by those skilled in the art that various modifications and equivalent exemplary embodiments are possible from the present disclosure. Accordingly, the actual technical protection scope of the present disclosure must be determined by the spirit of the appended claims.

What is claimed is:

1. A variable belt tensioner for an engine, comprising:
   a first damper;
   a second damper connected to the first damper through a driver;
   a first pulley that is driven by the first damper and the driver to set a tension of the belt as the first tension, the second tension, or the third tension; and
   a second pulley that is driven by the second damper and the driver to set a tension of the belt as the first tension, the second tension, or the third tension,
   wherein the first damper, the second damper, and the driver cause a belt connected to a crankshaft pulley and a starter-generator pulley to have a first tension when the engine including the crankshaft pulley starts,
   wherein the first damper, the second damper, and the driver cause the belt to have a second tension that is less than the first tension when an electric power is generated by the starter-generator pulley, and
   wherein the first damper, the second damper, and the driver cause the belt to have a third tension that is less than the second tension when the vehicle is accelerated by the engine.

2. The variable belt tensioner of claim 1, wherein the driver includes a solenoid device including a spring.

3. The variable belt tensioner of claim 2, wherein the solenoid device further includes a solenoid actuator compressing the spring.

4. The variable belt tensioner of claim 1, wherein the belt is connected to the crankshaft pulley and the starter-generator pulley is connected to a compressor pulley.

5. A method for controlling a mild hybrid vehicle using a variable belt tensioner for an engine, the method comprising steps of:
   controlling, by a controller, a driver connected to a first damper and a second damper that are included in the variable belt tensioner at a start of the engine including a crankshaft pulley to set a tension of a belt connected to the crankshaft pulley and a starter-generator pulley to a first tension;
   controlling, by the controller, the driver to set a tension of the belt to a second tension that is less than the first tension when an electric power is generated by the starter-generator pulley; and
   controlling, by the controller, the driver to set a tension of the belt to a third tension that is less than the second tension when the mild hybrid vehicle is accelerated by the engine,
   wherein the variable belt tensioner further comprises:
   a first pulley that is driven by the first damper and the driver to set a tension of the belt as the first tension, the second tension, or the third tension; and
   a second pulley that is driven by the second damper and the driver to set a tension of the belt as the first tension, the second tension, or the third tension.

6. The method of claim 5, wherein the step of controlling the driver to set the tension of the belt to the first tension comprises:
   compressing, by the controller, a spring of the driver to set the tension of the belt to the first tension.

7. The method of claim 5, further comprising a step of:
   controlling, by the controller, the driver to set the tension of the belt to the second tension when an angular velocity fluctuation of a crankshaft of the engine has a maximum value.

8. The method of claim 5, further comprising a step of:
   controlling, by the controller, the driver to set the tension of the belt to the third tension when an angular velocity fluctuation of a crankshaft of the engine is reduced.

* * * * *